F. C. WILLIAMS.
COMBINED LAMP AND MATCH BOX.
APPLICATION FILED MAY 27, 1919.
1,403,278.
Patented Jan. 10, 1922.
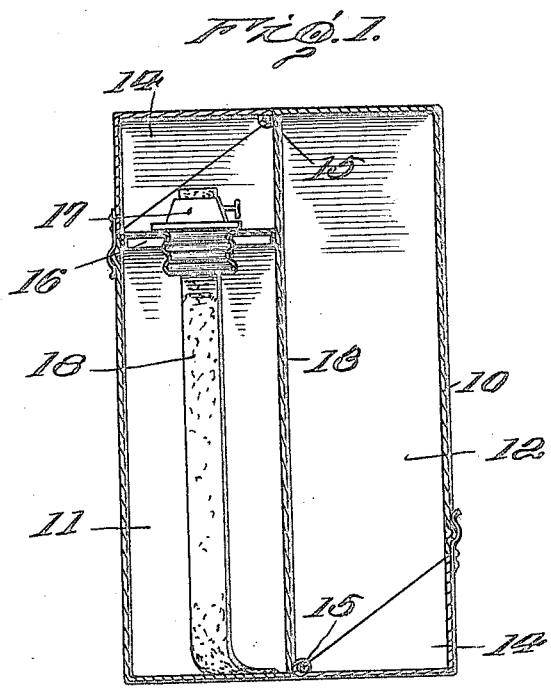
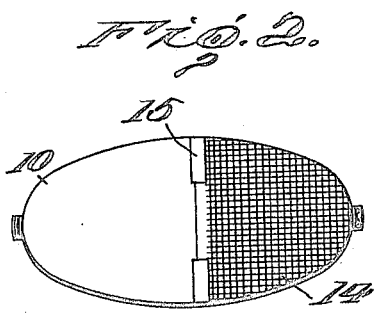
Inventor
Frank C. Williams
By Wm. S. Hodges
Attorney

UNITED STATES PATENT OFFICE.

FRANK C. WILLIAMS, OF MONTELLO, NEVADA.

COMBINED LAMP AND MATCH BOX.

1,403,278.   Specification of Letters Patent.   Patented Jan. 10, 1922.

Application filed May 27, 1919. Serial No. 300,106.

*To all whom it may concern:*

Be it known that I, FRANK C. WILLIAMS, a citizen of the United States, residing at Montello, in the county of Elko and State of Nevada, have invented a new and useful Combined Lamp and Match Box, of which the following is a specification.

This invention is an emergency lamp combined with a match box, and designed primarily for the use of miners although not limited to such use.

It is common practice in many mines to employ acetylene lamps for illumination underground. Such lamps frequently become foul and unserviceable, and it is not an uncommon experience for the light to fail because of the exhaustion of the carbide or water, or both. Under such conditions the miner, by reason of the darkness, is handicapped in recharging the lamp or cleaning it if necessary, resulting in loss of time and frequent accidents.

One of the objects of the invention is to provide an emergency lamp which is intended to burn for very short periods, long enough to furnish illumination sufficient to enable a miner to repair a disabled acetylene lamp or to recharge the same as occasion may require. A further object is to provide a lamp of this character of such dimensions that it may be carried in the pocket, and provided with a compartment for carrying matches. A further object is to provide means whereby the flame may be more or less protected from draft.

The invention will be hereinafter fully set forth and particularly pointed out in the claim.

In the accompanying drawing:—

Figure 1 is a longitudinal sectional view illustrating a lamp constructed in accordance with the invention. Figure 2 is a bottom end view thereof.

Referring to the drawing, 10 designates a casing which may be of any desired shape in cross section, an elliptical form being shown for the purpose of illustration. Said casing is divided into two chambers 11, 12, by a middle partition wall 13, extending throughout the length of the casing, the chamber 11 being designed to receive an illuminating oil, and the chamber 12 being designed as a receptacle for matches. One end wall of the casing extends over and closes the contiguous end of one chamber, the other end wall being extended over and closing the contiguous end of the other chamber, whereby chambers are open at one end closed at the other, the open end of each chamber being contiguous to the closed end of the other chamber. The open ends of both chambers are closed by covers 14, hinged to the casing 10 in suitable manner as indicated at 15. The chamber 11 is provided with a supporting wall 16 for a burner 17, provided with a wick 18, said wick extending into the chamber 11. The supporting wall 16 is so located that the burner 17 is positioned below the upper ends of the side walls of the chamber 11, so that the flame of the lamp is protected from drafts. It will be observed that the outer walls of the casing contiguous to the open ends of the chambers are cut away to provide inclined top edges, sloping downwardly from the partition wall 13 to the front wall of the chamber, and the bottom edges of each cover 14 are complemental to said top edges, so that the covers 14 are of a triangular shape in side view, and each cover when closed, lies flush with the closed end of the contiguous chamber. One of the covers is provided with a roughened porion 19 which serves as a scratching surface for matches.

In practice, the chamber 11 is filled with lard oil or some other non-explosive illuminating fluid, and then the burner 17 and the wick 18 are secured in position, the wick being of a size to occupy a large portion of the capacity of chamber 11, the burner serving to seal said chamber. The cover 14 is then closed, the parts being constructed to provide a tight fit. The chamber 12 is filled with matches, and the lamp is then ready for use. Should occasion require the use of the lamp, the operator removes a match from the chamber 12 and then closes said chamber. The cover 14 over the burner 17 is then raised and the wick ignited, whereupon sufficient illumination is provided to enable the operator to repair or refill an acetylene lamp, or to attend to any other emergency work which may be required.

Having thus explained the nature of the invention and described an operative manner of constructing and using the same, although without attempting to set forth all of the forms in which it may be made, or all of the forms of its use, what is claimed is:—

A lamp of the character described comprising a casing provided with a middle partition extending through the length of the casing and dividing it into two chambers, one end of said casing being extended over and closing the contiguous end of one chamber the other end wall being extended over and closing the contiguous end of the other chamber, whereby each chamber has an open end contiguous to a closed end of other chamber, a fixed supporting wall extended across one of said chambers and completely closing the same, a burner supported by said wall and communicating with the contiguous chamber, said supporting wall and said burner being spaced a sufficient distance from the open end of their chamber to protect the flame of the lamp from drafts, and covers for the open ends of the respective chambers, said covers being hinged to the casing contiguous to the middle partition.

In testimony whereof I have hereunto set my hand.

FRANK C. WILLIAMS.